US006988734B2

(12) United States Patent
Zierpka

(10) Patent No.: US 6,988,734 B2
(45) Date of Patent: Jan. 24, 2006

(54) ROTATING MACHINE, APPROXIMATELY IN THE FORM OF A HAND DRILL, A PERCUSSION DRILL, A DRILL HAMMER OR A BATTERY SCREWDRIVER

(76) Inventor: Günter Zierpka, Elfenweg 2, 76199 Karlsruhe (DE)

( * ) Notice: Subject to any disclaimer, the term of this patent is extended or adjusted under 35 U.S.C. 154(b) by 0 days.

(21) Appl. No.: 10/381,445

(22) PCT Filed: Jul. 18, 2002

(86) PCT No.: PCT/DE02/02632

§ 371 (c)(1),
(2), (4) Date: Aug. 12, 2003

(87) PCT Pub. No.: WO03/015991

PCT Pub. Date: Feb. 27, 2003

(65) Prior Publication Data

US 2004/0013485 A1 Jan. 22, 2004

(30) Foreign Application Priority Data

Jul. 26, 2001 (DE) .......................... 201 12 117 U

(51) Int. Cl.
*B23D 31/107* (2006.01)

(52) U.S. Cl. ......................... 279/75; 279/125; 408/240

(58) Field of Classification Search .................. 279/19, 279/19.3, 19.6, 71, 74, 75, 125, 134, 81, 279/82; 307/326; 408/9, 240, 710
See application file for complete search history.

(56) References Cited

U.S. PATENT DOCUMENTS

| | | | | | |
|---|---|---|---|---|---|
| 1,056,076 | A | * | 3/1913 | Wiard | 279/75 |
| 3,428,327 | A | | 2/1969 | Sindelar | |
| 3,698,729 | A | * | 10/1972 | Scharfen et al. | 279/4.02 |
| 3,985,368 | A | * | 10/1976 | Better et al. | 279/75 |
| 4,830,549 | A | * | 5/1989 | Neumaier et al. | 408/9 |
| 4,878,679 | A | * | 11/1989 | Plank et al. | 279/19.4 |
| 5,013,194 | A | | 5/1991 | Wienhold | |
| 5,199,833 | A | * | 4/1993 | Fehrle et al. | 408/239 R |
| 5,954,347 | A | * | 9/1999 | Buck et al. | 279/20 |
| 6,193,242 | B1 | * | 2/2001 | Robison | 279/137 |

(Continued)

FOREIGN PATENT DOCUMENTS

DE 915 080 7/1954

(Continued)

*Primary Examiner*—Derris H. Banks
*Assistant Examiner*—Michael W. Talbot
(74) *Attorney, Agent, or Firm*—Collard & Roe, P.C.

(57) ABSTRACT

The invention relates to a tool-receiving element, the tool-clamping device thereof being directly integrated into the rotating machine. A multiple-edge longitudinal recess (21, 121,221), especially a hexagonal recess, extends into the drive shaft (18,118,218) from the output-side front end thereof. A clamping sleeve (25,25',125,225) is received on the section of the drive shalt comprising the tool-receiving element, in the form of a tool-clamping device, by which means at least one locking element (24,124,224) received in a radial recess penetrating the shell of the tool-receiving element can be actuated in a locking position protruding radially into the tool-receiving element, and can be released in an unlocking position for radial yielding.

17 Claims, 3 Drawing Sheets

U.S. PATENT DOCUMENTS

| | | | | |
|---|---|---|---|---|
| 6,244,798 | B1 * | 6/2001 | Podlipec et al. | 409/234 |
| 6,302,408 | B1 * | 10/2001 | Zierpka | 279/75 |
| 6,536,780 | B2 * | 3/2003 | Baumann et al. | 279/19.4 |
| 6,651,990 | B2 * | 11/2003 | Higasi et al. | 279/19.4 |
| 2001/0013683 | A1 * | 8/2001 | Yahagi | 279/19.4 |
| 2002/0125652 | A1 * | 9/2002 | Hanke | 279/19.4 |

FOREIGN PATENT DOCUMENTS

| | | | |
|---|---|---|---|
| DE | 297 08 384 | | 8/1997 |
| EP | 0 685 300 | | 12/1995 |
| GB | 2100651 | A * | 1/1983 |
| JP | 04 365 563 | | 12/1992 |

* cited by examiner

ROTATING MACHINE, APPROXIMATELY IN THE FORM OF A HAND DRILL, A PERCUSSION DRILL, A DRILL HAMMER OR A BATTERY SCREWDRIVER

The invention relates to a rotating machine that may be a hand drill, a percussion drill, a drill hammer or a battery screwdriver that comprises a drive shaft actively connected with a drive motor received within a machine housing and extended from the machine housing, as well as a tool-receiving element with a tool-clamping device for coupling a drill, a screwdriver bit or a similar tool with the drive shaft in a detachable manner.

Rotating machine of this type are known; however, they are afflicted with the drawback of complicated handling in particular in view of a quick change of the tool that can be carried out in a simple manner.

For example, hand drills are frequently and percussion drills are basically equipped with key-operated, toothed-rim drill chucks, by means of which predominantly drilling tools with round shafts can be chucked. The operation of such chucks is linked to the availability of a fitting key and, furthermore, it is complicated and time-consuming.

Known are also such machines with so-called quick-action chucks, in connection with which a clamping sleeve with a fine thread serves for actuating the clamping jaws, which however, permit only the application of moderate clamping forces and, furthermore, chucking and releasing of the tools that is time-consuming as well. In particular, however, such a chucking technique implies considerable accident risks in that in practical life, and in contradiction to the applicable accident prevention regulations, the running machine is frequently used when the tool is changed for clamping a tool shaft inserted in a chuck, with the user tightly holding the clamping sleeve of the chuck with one hand.

It is characteristic of the known chucking devices that they are equipped with toothed rims or provided with enhanced gripping power by means of longitudinal grooves, corrugations or the like that substantiate the risk of accidents while the machines are running.

As opposed to the above, the aim of the invention is to provide a rotating machine of the type and for the purpose specified above that has a tool-receiving element and tool-clamping device that has been improved vis-à-vis the prior art, and in connection with which the tool can be chucked in a particularly simple manner and quickly changed without posing the accident risks observed in connection with known systems.

Said problem is solved according to the invention in that in connection with a rotating machine as defined in the introductory part of claim 1, the tool-receiving element with the tool-clamping device is directly integrated in the rotating machine in that a multiple-edge recess, in particular a hexagonal recess is extending into the drive shaft from the output-side front end thereof; and in that a clamping sleeve serving as the tool-clamping device is received on the section of the drive shaft comprising the tool-receiving element, by means of which clamping sleeve at least one locking element that is received in a radial recess penetrating the shell of the tool-receiving element, can be actuated into a locking position that radially projects into the tool-receiving element, and can be released into an unlocking position for radial yielding.

The rotating machine as defined by the invention is suitable and intended for chucking tools with a multiple-edge shaft with a locking groove extending all around, in particular in the form of a hexagonal shaft that is adapted to the multiple-edge longitudinal recess forming the tool-receiving element. When the tool is chucked, said locking groove is engaged by at least one locking element that can be actuated into its locking position by means of the clamping sleeve.

Battery screwdrivers and hand drills whose direction of rotation can be reversed, and which comprise hexagonal recesses extending from the face end of the drive shaft into the shaft, are known, with screwdriver bits that can be plugged into the screwdriver after the chuck has been unscrewed. However, with such machines, inserted screwdriver bits are only retained in a spring-type arresting device which, when a bit is plugged in or pulled put, is overcome by low axial forces and does not permit any true chucking of a tool.

Useful further developments of the invention are specified in the dependent claims.

For example, an important further development is characterized in that the tool-receiving element that extends in the form of a multiple-edge longitudinal recess into the drive shaft, or into a receiving pin projecting from the drive shaft, is limited with respect to its depth by a tapering centering cone for supporting and centering an end of the tool shaft that comprises an adapted counter cone.

In addition to supplying the required axial support of a tool, the arrangement of a centering cone in the depth of the tool-receiving element provides for precise centering of the tool on the end of the shaft. Such centering usefully cooperates with a centering of the shaft that is axially spaced from the centering cone. A centering of the shaft of a tool that is axially spaced from the centering cone can be realized in a simple manner in that three locking balls serve as clamping elements that can be actuated by means of the clamping sleeve between a locking position and an unlocking position. Such clamping elements are received in radial recesses that are penetrating the shell of the receiving pin of the tool-receiving element near its free face end, and are arranged with uniform distribution over the circumference.

Characteristic of a tool-receiving element and tool-clamping device that is realized in such a manner is a precise centering of the end of the shaft, and, spaced therefrom, of the shaft extending to the actual tool, in that in the locking position, three locking balls that are uniformly distributed over the circumference, engage a peripheral groove of the tool shaft.

The clamping sleeve is usefully provided with locking projections for actuating and arresting therein the locking balls in their locking positions. The locking projections should be realized in the form of spherical indentations that are adapted to the locking balls. In order to assure particularly safe locking of a chucked tool, the locking projections of the clamping sleeve may be arranged also on spring fingers that protrude from the clamping sleeve axially. The radial mobility of the spring fingers may be limited by stop means that surround the spring fingers on their outer sides and support the latter, if necessary.

According to another important further development of the invention, provision is made that the clamping sleeve is realized in the form of a sliding sleeve that can be axially actuated between the locking position and the unlocking position. Such a sliding sleeve may be directly supported on the receiving pin into which the multiple-edge longitudinal recess as the tool-receiving element is extending, and it may be a part of an actuating sleeve that is axially guided in a displaceable manner on the receiving pin of the tool-receiving element.

However, the sliding sleeve may be connected also in an axially fixed manner with an actuating sleeve that is guided on the machine housing with torsional strength, but with the sliding sleeve having rotational mobility versus said actuating sleeve. In particular, the actuating sleeve of the tool-clamping device may be received on a socket of the housing that protrudes from the machine housing and surrounds the receiving pin of the tool-receiving element over part of its longitudinal expanse.

However, the rotating machine as defined by the invention may be realized also in such a manner that the actuating sleeve that is received in an axially displaceable manner on the socket of the housing, can be axially fixed in the locking position. This prevents any random displacement of the actuating sleeve and thus of the clamping sleeve from the locking position.

The axial locking of the locking sleeve and thus of the clamping sleeve in the locking position is realized in a preferred embodiment in that the actuating sleeve, which is connected with the clamping sleeve in an axially fixed manner, is provided with at least one guiding protrusion that projects beyond the contact surface with the socket of the housing; and that such a guiding protrusion engages a guiding groove that extends in the socket of the housing. This guiding groove is adjoined by a locking section that is extending in the peripheral direction and which, in the locking position, permits a limited rotation of the actuating sleeve versus the housing socket receiving the latter, whereby the guiding protrusion is driven into the locking section and provides there for an axial fixation of the actuating sleeve. The guiding protrusion of the actuating sleeve may be usefully at least one guiding ball that is acted upon by spring force and received in a radial recess of the actuating sleeve.

According to another useful further development of the rotating machine as defined by the invention, the axial displacement of the sliding sleeve is limited by at least one elastic locking cam that engages in that locking and unlocking positions an arresting element. A clear positioning of the sliding sleeve in its two functional end positions is realized in this manner.

The arresting elements engaged by the locking cams in the respective end positions of the sliding sleeve may be locking grooves that are axially spaced from each other and radially grooved into the receiving pin, or into a socket of the housing that is surrounding the receiving pin and supporting the actuating sleeve with torsional strength.

However, according to another important further development of the invention, the sliding sleeve may also be actuated by means of an electromagnet that engages the actuating sleeve that is connected with the sliding sleeve in an axially fixed manner, yet with rotational mobility. Such an electromagnet may be designed in the form of a double-action electromagnet that thus permits actuation of the sliding sleeve serving as the clamping sleeve from the unlocking position into the locking position, and vice versa from the latter back again into the unlocking position. However, the sliding sleeve may be actuated also by means of an electromagnet against the action of a resetting spring.

Finally, a particularly important embodiment of the invention is characterized in that the receiving pin of the tool-receiving element with the tool-clamping device is covered by a housing cover that is connected with the machine housing, which makes it impossible for the user to access the sliding sleeve or actuating sleeve.

The rotating machine as defined by the invention may be, for example a battery screwdriver, a hand drill, a percussion drill, or also a drill hammer. Its embodiment in the form of a drill hammer is characterized in that the tool-receiving device, thus the multiple-edge longitudinal recess is limited in the depth by a tappet that is received with axial mobility in the drive shaft. Such a tappet is realized in the form of a sleeve and, on the side pointing in the direction of the tool-receiving device, comprises a narrowing centering cone, and that is actively connected with an axial drive operating in a pulsating manner.

As explained already above, the centering cone provides for precise centering of the shaft end of a tool received in the tool-receiving element. The axial drive operating in a pulsating manner in particular may be a pneumatic drive of the type known to be used in conjunction with drill hammers.

In the embodiment in the form of a drill hammer, the tools to be used have to have a locking groove that is extending all around and has a width that is greater than the axial expanse of the locking element engaging the locking groove in the locking situation, so that such a tool is capable of performing, within the framework of the expanse of the width of the locking groove, pulsating axial movements within the tool-receiving element, which is not participating in such a pulsation.

Different embodiments of the rotating machine as defined by the invention are explained in the following with the help of the attached drawings. The schematic views show the following:

Figure 11:
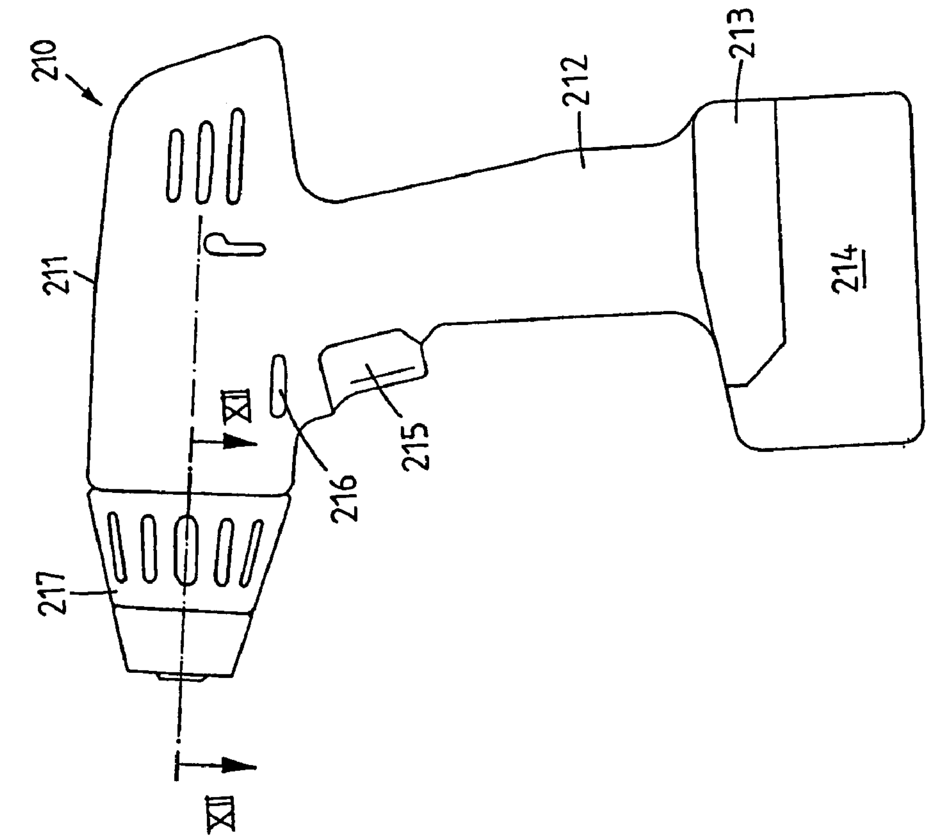
Figure 1:
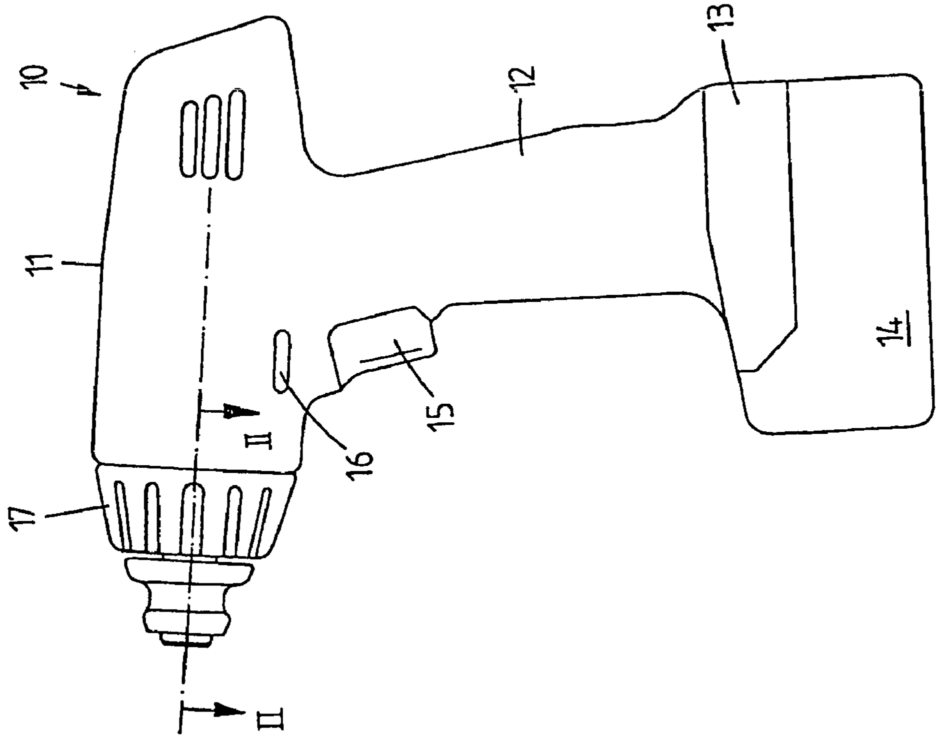
FIG. 1 is a side view shoring a battery screwdriver with a tool-receiving element that is connected with a drive shaft on the output side end that is actively connected with a drive motor, and which comprises a tool-clamping device that is received in said tool-receiving element.
Figure 12:
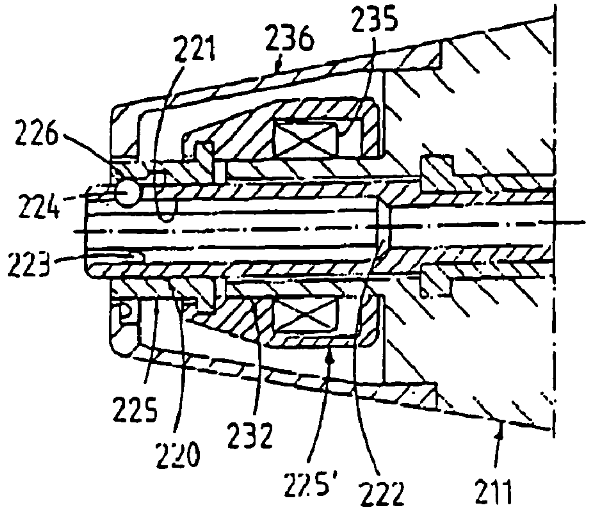

FIG. 11 shows by a view as in FIG. 1 an alternative embodiment of a battery screwdriver, in which the tool-receiving element and the tool-clamping device are received within a cover of the housing; and FIG. 12 is a longitudinal section conforming to section line XII—XII in FIG. 11, through the output side area of the battery screwdriver, with the tool-receiving element and the tool-clamping device.

Figure 2:
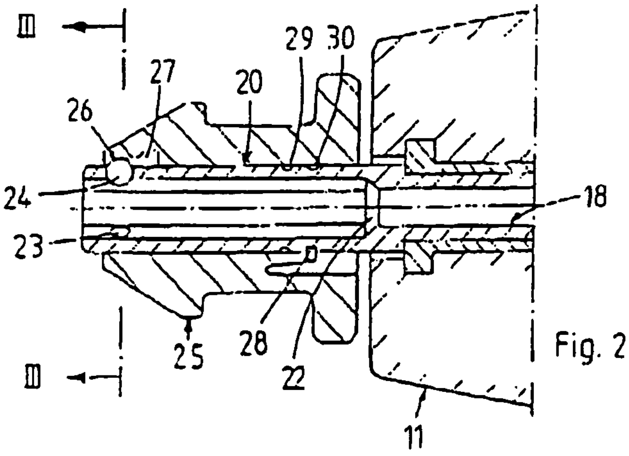
FIG. 2 is a longitudinal section through the area of the battery screwdriver on the output side, with the tool-receiving element and the tool-clamping device.
Figure 3:
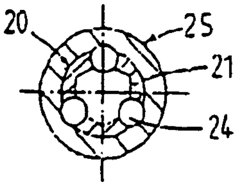
FIG. 3 is a cross section according to section line III—III in FIG. 2 through the tool-receiving element and the tool-clamping device.

The battery screwdriver 10 shown in FIGS. 1 to 3 has a housing 11, from which a handle 12 with a coupling shoe 13 for a detachably coupled battery 14 is projecting at about a right angle. A drive motor is accommodated within the screwdriver. This drive motor can be switched on and off by means of a power switch 15; its direction of rotation can be reversed by means of a reversing switch 16.

A drive shaft 18 is actively connected with the drive motor via a transmission as well as a slipping clutch that can be adjusted with respect to the torque to be transmitted by means of a set wheel 17 that is associated with the housing 11 on the output side. The drive motor, the transmission and the slipping clutch are not shown in the drawing and do not require any further explanation because such driving elements are generally known in connection with battery screwdrivers.

The drive shaft 18, which is designed in the form of a hollow shaft, is extended from the housing 11 with the set ring 17, and can be rotated in the housing 11 in a manner not of any further interest here, but it is supported in an axially fixed manner. At the face end, the drive shaft is projecting with a receiving pin 20 beyond the housing 11 with the setting ring 17. From the free face end of the receiving pin 20, a hexagonal longitudinal recess extends into said receiving pin, serving as the tool-receiving element 21 for receiving tools equipped with adapted hexagonal shafts. The hexagonal longitudinal recess ends in the depth in a centering cone 22. Near the end of the receiving pin 20 that is removed from the housing 11, the shell of said receiving pin is penetrated by the three radial recesses 23 that are arranged with even distribution across the circumference. The locking balls 24 are received in said radial recesses and serve as radially movable locking elements.

A clamping sleeve realized in the form of a sliding sleeve 25 is received on the projecting receiving pin 20 and is axially displaceable on the latter. The sliding sleeve 25 can be actuated between a locking position and an unlocking position. In the locking position, which is shown in FIGS. 2 and 3, the locking balls 24 project radially into the hexagonal recess Q* and are maintained in that position by the locking protrusions 26 of the sliding sleeve 25. In the advanced unlocking position of the sliding sleeve 25, however, the locking balls 24 are capable of radially yielding into the radial recesses 27 that axially adjoin the arresting protrusions 26 in the sliding sleeve, in a manner such that they will no longer protrude into the tool-receiving element 21 formed by the hexagonal longitudinal recess.

The locking protrusions 26 of the sliding sleeve 25 are adapted to the locking balls 24 and realized in the form of hollow spherical indentation in a manner such that in the chucked condition of a tool, the locking balls are flatly supported on the locking protrusions.

The sliding sleeve,25 is positioned in the advanced unlocking position and in the retracted locking position, the latter being axially spaced from the former, by means of at least one locking cam 28 that is elastically mounted on the sliding sleeve. In the respective end positions, this locking cam engages a locking groove 29, 30 that is radially grooved into the receiving pin 20 from the outside.

The battery screwdriver 10 is intended for chucking tools with a hexagonal shaft and a centering cone arranged on the end of the shaft, as well as with a ring groove extending all around with a spacing from the centering cone. The distance of the ring groove extending all around in the shaft of the tool, from the centering cone at the face end corresponds with the distance between the centering cone 22 at the end of the hexagonal longitudinal recess forming the tool-receiving element 21, and the locking balls 24, the latter being received in the radial recesses 23 arranged near the free face endo of the receiving pin.

The shaft of such a tool can be pushed into the tool-receiving element 21 when the sliding sleeve 25 is in the advanced unlocking position, in which the locking balls are capable of yielding radially out of the area of the hexagonal longitudinal recess forming the tool-receiving element. After the shaft of a tool has been completely inserted and is then supported with its centering cone on the inner centering cone 22 of the tool-receiving element 21, the tool can be chucked in the tool-receiving element 21 by retracting the sliding sleeve into the locking position shown in FIGS. 2 and 3, causing the locking balls 24 to engage the circular locking groove of the tool shaft.

In view of the centering of the tool by means of the cooperation between the face-end centering cone on the tool shaft with the counter cone 22 in the depth of the hexagonal longitudinal recess, and axial centering spaced therefrom due to the engagement of the locking balls 24 in the circular locking groove of the tool, precise entering of the shaft of the tool in the tool-receiving element is assured.

Figure 4:
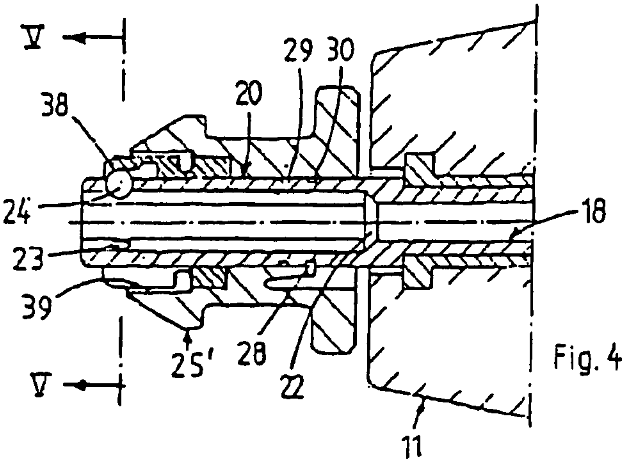
FIG. 4 is a view like the one shown in FIG. 2, of a battery screwdriver with a modified tool-clamping device.
Figure 5:
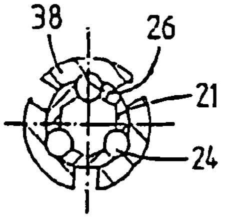
FIG. 5 shows, analogous to FIG. 3, a cross section conforming to section line V—V in FIG. 4, through the tool-receiving element and the tool-clamping device of the embodiment according to FIG. 4.

The embodiment shown in FIGS. 4 and 5 is different from the battery screwdriver shown in FIGS. 2 and 3 on account of the fact that the locking protrusions 26 are arranged on three spring finders 38 that extend axially from the sliding sleeve 25'. In the locking position shown, these finger springs are capable of radial yielding to a limited extent in the interest of a desirable compensation of tolerances. The spring path of the spring fingers 38 is limited by a stop shoulder 39 extending radially around such spring fingers.

In views similar to those shown in FIGS. 2 and 3, FIGS. 6 and 7 show an alternative embodiment of the tool-receiving element 121 and the tool-clamping device. Reference numerals each increased by 100 are used in FIGS. 6 and 7 for parts identical to those shown in FIGS. 1 to 3.

Figure 6:
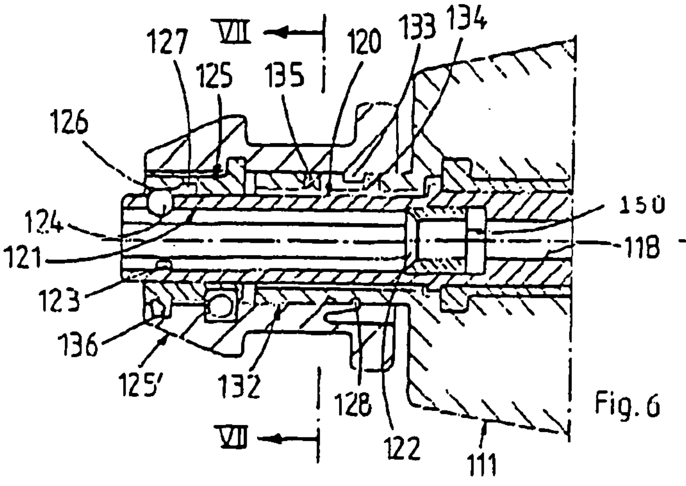
FIG. 6 shows, by a view as seen in FIGS. 2 and 4, a longitudinal section through the output-side area of a battery screwdriver, in which the tool-clamping device has an actuating sleeve that is not designed as a jointly rotating sleeve.
Figure 7:
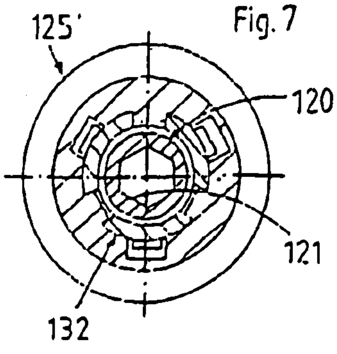
FIG. 7 is a cross section according to section line VII—VII in FIG. 6, through the tool-receiving element and the sliding sleeve of the tool-clamping device.

The alternative embodiment according to FIGS. 6 and 7 comprises a receiving pin 120 as well, which is projecting beyond the housing 111 with the set ring 117, and a hexagonal longitudinal recess 121 serving as the tool-receiving element 121.

Within the area of the face-side end of the receiving pin 120, the shell of the latter is again penetrated by the radial recesses 123 that are arranged with even distribution over the circumference. The locking balls 124 serving as locking elements are received in said radial recesses with radial mobility. Furthermore, on the end section of the receiving pin equipped with the locking balls 124, a clamping sleeve 125 is received that can be displaced axially. This clamping sleeve has the front locking protrusions 126 for arresting the locking balls 124 in the locking position projecting into the hexagonal longitudinal recess. This clamping sleeve has provided with the radial recesses 127 that axially adjoin the locking protrusions. The locking balls 124 are capable of radial yielding into said radial recesses 127 when the clamping sleeve 125 is advanced into the unlocking position.

As opposed to the first embodiment, the clamping sleeve 125, which is received on the receiving pin 120 with torsional strength and realized in this case in the form of a sliding sleeve as well, is not forming one piece with an operating sleeve, but connected with an operating sleeve 125' in an axially fixed yet still rotatable manner, Said operating sleeve is, in turn, supported in an axially displaceable manner on a housing socket 132 that is concentrically surrounding the receiving pin 120 over part of its longitudinal expanse. The rotational connection of the operating sleeve 125' with the clamping sleeve 125 can be realized via a sliding bearing, for example by means of a radial protrusion of the clamping sleeve engaging a corresponding radial groove of the operating sleeve, as it is shown in the upper half of FIG. 6, or by means of a ball bearing as shown in the lower half of the sectional view in FIG. 6. Again, the operating sleeve 125' can be positioned in its two end positions, namely in the clamping position shown in FIG. 6, and in an unlocking position that is advanced versus the clamping position, by means of an elastic locking cam projecting from said operating sleeve, in that the locking cam engages ring grooves that are axially spaced from each other and grooved into the housing socket 132 that is projecting from the housing 111 and concentrically surrounding the receiving pin 120 over part of its longitudinal expanse.

The operating sleeve 125', which is received on the housing socket 132 with axial mobility yet with torsional strength, has a cam 133 projecting into a longitudinal recess penetrating the housing socket 132. In each of the end positions of the sliding sleeve, said cam actuates an electrical contact 134, 135 arranged on the one and other end of the longitudinal recess. These contacts allow the rotating machine to be switched on only when a tool has been correctly chucked in the tool-receiving element.

In the embodiment according to FIGS. 6 and 7, furthermore, the gap between the clamping sleeve 125 and the operating sleeve 125', the latter being connected with the former in a rotational yet axially fixed manner, is protected against the penetration of dirt by means of an O-ring 136 near the face end that is removed from the machine housing.

As in the first embodiment, the tool-receiving element 121 is equipped in the depth with a tapering centering cone 122 for centering the end of the shaft of the tools to be used that is provided with a centering cone. However, as opposed to the first embodiment, said centering cone 122 is a component of a tappet 150 that is arranged in an axially movable manner in the depth of the tool-receiving element. Said tappet is actively connected with a pulsating axial drive, for example a pneumatic drive as it is known in connection with drill hammers.

The alternative embodiment according to FIGS. 6 and 7 is intended for the application of tools in connection with which, as with conventional drill hammers, the ring groove extending all around with a spacing from the centering cone that is arranged on the end of the shaft, has an expanse of its width that is greater than the axial depth of engagement of the locking balls 124 in the locking position.

Thus the embodiment shown in FIGS. 6 and 7 is a battery screwdriver that can be used also as a drill hammer, in connection with which, by means of a pneumatic drive or a tappet 150 driven in a pulsating manner or in some other way, an axial movement can be superimposed on a rotational movement of a chucked tool within the framework of the expanse of the width of the ring groove arranged on the shaft of a corresponding tool.

Figure 8:
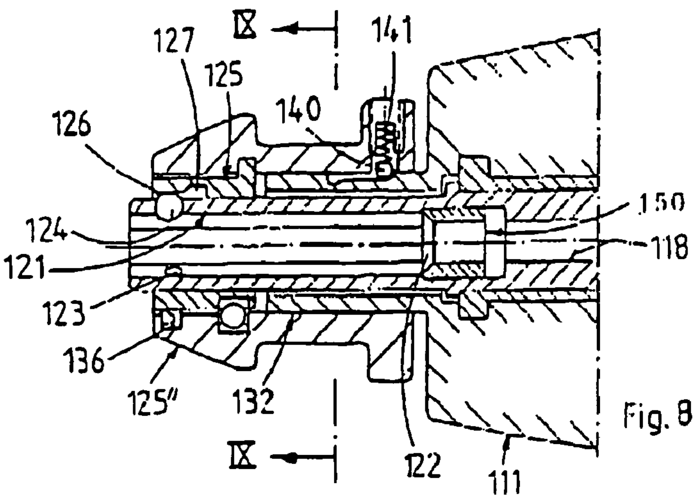
FIG. 8 shows an alternative embodiment to FIG. 6, where the actuating sleeve can be arrested in the locking position.
Figure 9:
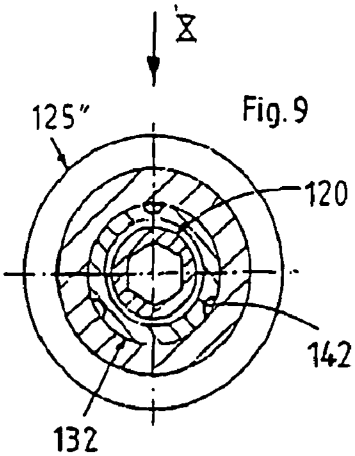
FIG. 9 shows, analogous to FIG. 7, a cross section conforming to section line IX—IX in FIG. 8, through the tool-receiving element and the tool-clamping device of the embodiment according to FIG. 8.
Figure 10:
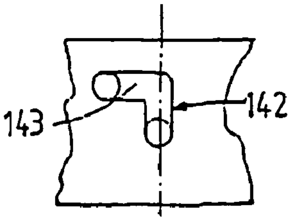
FIG. 10 shows a guide link for the actuating sleeve that can be locked in the locking position, by a view according to the arrow X in FIG. 9 of a protruding section of the housing.

The embodiment shown in FIGS. 8 to 10 is different from the embodiment explained above in connection with FIGS. 6 and 7 on account of the fact that the actuating sleeve 125" received on the housing socket 132 has no locking cams cooperating with the ring grooves of the housing socket, but the actuating sleeve 125" can be axially arrested in the locking position shown in FIG. 8. The actuating sleeve 125", which is connected with the clamping sleeve 125 in an axially fixed manner, is equipped with the three guide balls 140 that are evenly distributed over the circumference with the same angular spacing. These guide balls are received in the transverse recesses 141 of the actuating sleeve and engage the guide grooves 142 that are acted upon by spring force and also uniformly distributed over the circumference of the housing socket 132. These guide grooves are axially extending over a longitudinal section that is corresponding with the axial movement of the actuating sleeve 125" from the retracted unlocking position into the advanced locking position, and are then bending off in the peripheral direction, forming the locking sections 143 at right angles. In this way, the actuating sleeve 125" can be axially arrested in the locking position by rotating versus the housing socket 132 because such rotation causes the guide balls 140 to be driven into the arresting sections 143.

In the embodiment shown in FIGS. 11 and 12, the same reference numerals as those used in FIGS. 1 to 3 are again used for identical parts, but increased by 200.

As in connection with the embodiment according to FIGS. 6 and 7, a clamping sleeve 225 is supported in an axially movable manner on the front part of a receiving pin 220 with the locking balls 224 received in the radial recesses 223, and connected in an axially fixed yet rotatable manner with an actuating sleeve 225'. This actuating sleeve itself is supported with torsional strength, but in an axially displaceable manner on a housing socket 232 that is extending over part of the length of the receiving pin 220 and projecting from the housing 211. The clamping sleeve 225 is actuated between its locking position, in which the locking balls 224 are capable of yielding into the hexagonal longitudinal recess that is forming the tool-receiving element 221 that is closed in the depth by a clamping cone 222, and an advanced unlocking position, in which the locking balls 224 are capable of radial yielding, by a double-action magnet 235 that is engaging an actuating sleeve 225' that is received on the housing socket 232 that is projecting from the housing 211 with the set ring, and concentrically surrounding the receiving pin 220 over part of its longitudinal expanse. This magnet can be realized in the form of a double-action magnet or it may actuated the clamping sleeve 225 in one of its end positions against the action of a reset spring.

As opposed to the embodiments according to FIGS. 1 to 10, in the embodiment according to FIGS. 11 and 12, the tool-receiving element with the tool-clamping device, the latter being received on the receiving pin or on a protrusion of the housing, are received within a housing cover 236 that is axially extending from the machine housing 211 with the set ring and surrounding the tool-receiving element and the tool-clamping device.

What is claimed is:

1. A rotatable machine comprising:

(a) a machine housing;

(b) a drive motor received within said machine housing;

(c) a drive shaft operatively connected with said drive motor extending from said machine housing, said drive shaft having an output-side end;

(d) a tool-receiving element disposed on a section of said drive shaft, said tool-receiving element comprising a shell, at least one radial recess penetrating said shell, and a clamping sleeve for detachably coupling a tool with said drive shaft;

wherein said tool-receiving element comprises a multiple-edge longitudinal recess extending from said output-side end into a receiving pin projecting from said drive shaft, said receiving pin comprising a receiving pin shell;

wherein at least one locking element is received in said radial recess, said at least one locking element being actuatable into a locking position radially projecting into said tool-receiving element and releasable into an unlocking position for radial yielding; and (e) three locking balls which serve as clamping elements actuated by said clamping sleeve between the locking position and the unlocking position, said locking balls being received in radial recesses uniformly distributed circumferentially over and penetrating said receiving pin shell near a free face end;

wherein said clamping sleeve has locking protrusions comprising spherical indentations corresponding to said locking balls for actuating and arresting said locking balls in the locking position.

2. The rotating machine according to claim 1, wherein the tool-receiving element is limited in depth by a tapering centering cone for supporting and centering the end of a tool shaft having a corresponding counter cone.

3. The rotating machine according to claim 1, wherein the locking protrusions of the clamping sleeve are arranged on spring fingers axially projecting from the clamping sleeve and radially limited by stop means.

4. The rotating machine according to claim 1, wherein the clamping sleeve comprises a sliding sleeve that can be axially actuated between the locking position and the unlocking position.

5. The rotating machine according to claim 4, wherein the sliding sleeve is directly supported on the receiving pin of the tool-receiving element.

6. The rotating machine according to claim 4 wherein the sliding sleeve is apart of an actuating sleeve supported and axially displaceable on the receiving pin of the tool-receiving element.

7. The rotating machine according to claim 1, wherein the multiple-edge longitudinal recess is limited in depth by a sleeve-like tappet received in the drive shaft in an axially movable manner, said tappet comprising a centering cone facing the tool-receiving element, and being actively connected with an axial pneumatic drive operating in a pulsating manner.

8. A rotatable machine comprising:

(a) a machine housing;

(b) a drive motor received within said machine housing;

(c) a drive shaft operatively connected with said drive motor extending from said machine housing, said drive shaft having an output-side end; and (d) a tool-receiving element disposed on a section of said drive shaft, said tool-receiving element comprising a shell, at least one radial recess penetrating said shell, and a clamping sleeve for detachably coupling a tool with said drive shaft;

wherein said tool-receiving element comprises a multiple-edge longitudinal recess extending from said output-side end into a receiving pin projecting from said drive shaft;

wherein at least one locking element is received in said radial recess, said at least one locking element being actuatable into a locking position radially projecting into said tool-receiving element and releasable into an unlocking position for radial yielding; and wherein the clamping sleeve comprises a sliding sleeve that can be axially actuated between the locking position and the unlocking position, said sliding sleeve being connected in an axially fixed manner with an actuating sleeve, yet rotatable versus the actuating sleeve, said actuating sleeve being guided with torsional strength but being axially movable on the machine housing.

9. The rotating machine according to claim 8, wherein the actuating sleeve of a tool-clamping device is received on a housing socket projecting from the machine housing and surrounding the receiving pin of the tool-receiving element over part of its longitudinal expanse.

10. The rotating machine according to claim 9, wherein the actuating sleeve axially displaceably received on the housing socket is axially fixable in the locking position.

11. The rotating machine according to claim 10, wherein the actuating sleeve connected with the clamping sleeve in an axially fixed manner is provided with at least one guide projection protruding beyond a contact surface with the housing socket and the guide projection engages a guide groove extending in the housing socket, said guide groove being adjoined by an arresting section extending in a peripheral direction and, in the locking position, permits a limited rotation of the actuating sleeve versus the housing socket, whereby the guide projection is driven into the arresting section and thereby provides for an axial arrest of the actuating sleeve.

12. The rotating machine according to claim 9, wherein axial displacement of the sliding sleeve is limited by at least one elastic locking cam engaging an arrest in the locking and unlocking positions.

13. The rotating machine according to claim 12, further comprising a plurality of arrests engaged by the locking cam in respective end positions of the sliding sleeve, said arrests comprising locking grooves axially spaced from each other grooved into the receiving pin or the housing socket surrounding the receiving pin and supporting the actuating sleeve with torsional strength.

14. The rotating machine according to claim 8, wherein electrical contacts are associated with the sliding sleeve or with the actuating sleeve said electrical contacts permitting the rotating machine to be switched on only if a tool is chucked in the tool-receiving element.

15. The rotating machine according to claim 8, wherein the sliding sleeve can be actuated by means of an electromagnet engaging the actuating sleeve, the actuating sleeve being connected with the sliding sleeve in an axially fixed yet rotatable manner.

16. The rotating machine according to claim 15, wherein the sliding sleeve is actuated into an end position by means of an electromagnet against action of a reset spring.

17. The rotating machine according to claim 15, wherein the receiving pin of the tool-receiving element with the clamping sleeve is covered by a housing cover connected with the machine housing.

* * * * *

UNITED STATES PATENT AND TRADEMARK OFFICE

CERTIFICATE OF CORRECTION

PATENT NO. : 6,988,734 B2

DATED : January 24, 2006

INVENTOR(S) : Zierpka

It is certified that error appears in the above-identified patent and that said Letters Patent is hereby corrected as shown below:

<u>Column 9,</u>
Line 32, change “apart” to -- a part --.

Signed and Sealed this

Eleventh Day of April, 2006

JON W. DUDAS

*Director of the United States Patent and Trademark Office*